United States Patent [19]

Frank et al.

[11] Patent Number: 4,501,603
[45] Date of Patent: Feb. 26, 1985

[54] METHOD AND APPARATUS FOR SHAPING GLASS SHEETS TO COMPLICATED SHAPES

[75] Inventors: Robert G. Frank, Murrysville; Michael T. Fecik, Pittsburgh; John J. Ewing, Tarentum, all of Pa.

[73] Assignee: PPG Industries, Inc., Pittsburgh, Pa.

[21] Appl. No.: 480,535

[22] Filed: Mar. 30, 1983

[51] Int. Cl.³ .......................................... C03B 23/035
[52] U.S. Cl. ...................................... 65/106; 65/104; 65/273; 65/290
[58] Field of Search ................. 65/104, 106, 273, 275, 65/290

[56] References Cited

U.S. PATENT DOCUMENTS

| | | | |
|---|---|---|---|
| 3,682,613 | 8/1972 | Johnson et al. | 65/275 X |
| 3,806,312 | 4/1974 | McMaster et al. | 432/121 |
| 3,846,104 | 11/1974 | Seymour | 65/104 |
| 4,056,379 | 11/1977 | Kelly et al. | 65/106 |
| 4,074,996 | 2/1978 | Hagedorn et al. | 65/106 |
| 4,092,141 | 5/1978 | Frank et al. | 65/114 |
| 4,203,751 | 5/1980 | Roth et al. | 65/106 |
| 4,210,435 | 7/1980 | Claassen | 65/106 |
| 4,210,436 | 7/1980 | Imler | 65/106 |
| 4,277,276 | 7/1981 | Kellar et al. | 65/106 |
| 4,282,026 | 8/1981 | McMaster et al. | 65/273 |
| 4,297,118 | 10/1981 | Kellar et al. | 65/104 |
| 4,300,935 | 11/1981 | Seymour | 65/107 |
| 4,305,746 | 12/1981 | Hagedorn et al. | 65/106 |
| 4,312,661 | 1/1982 | Hagedorn et al. | 65/290 |
| 4,331,464 | 5/1982 | Claassen et al. | 65/273 |

Primary Examiner—Arthur Kellogg
Attorney, Agent, or Firm—Andrew C. Siminerio; Edward I. Mates

[57] ABSTRACT

Bending a glass sheet to a complicated shape that comprises one portion bent sharply relative to a main portion of the sheet involving the use of a vacuum holder, an auxiliary shaping rail and means to correlate the movement of the shaping rail with that of the glass sheet during a bending cycle to insure that the glass sheet is clear of the auxiliary shaping rail except for such time in the glass sheet bending cycle that requires the auxiliary shaping rail to engage the glass sheet portion to be sharply bent against the corresponding portion of the vacuum holder. Another feature incorporated in a preferred embodiment of the present invention facilitates ready removal of glass fragments whenever a flawed glass sheet fractures at or beyond a shaping station outside a furnace where the glass sheet is heated to its deformation temperature.

23 Claims, 6 Drawing Figures

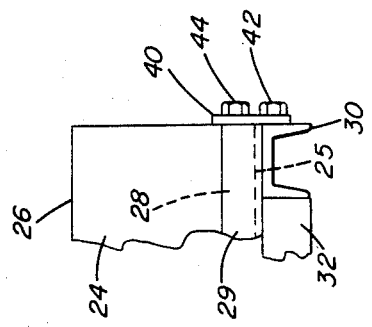
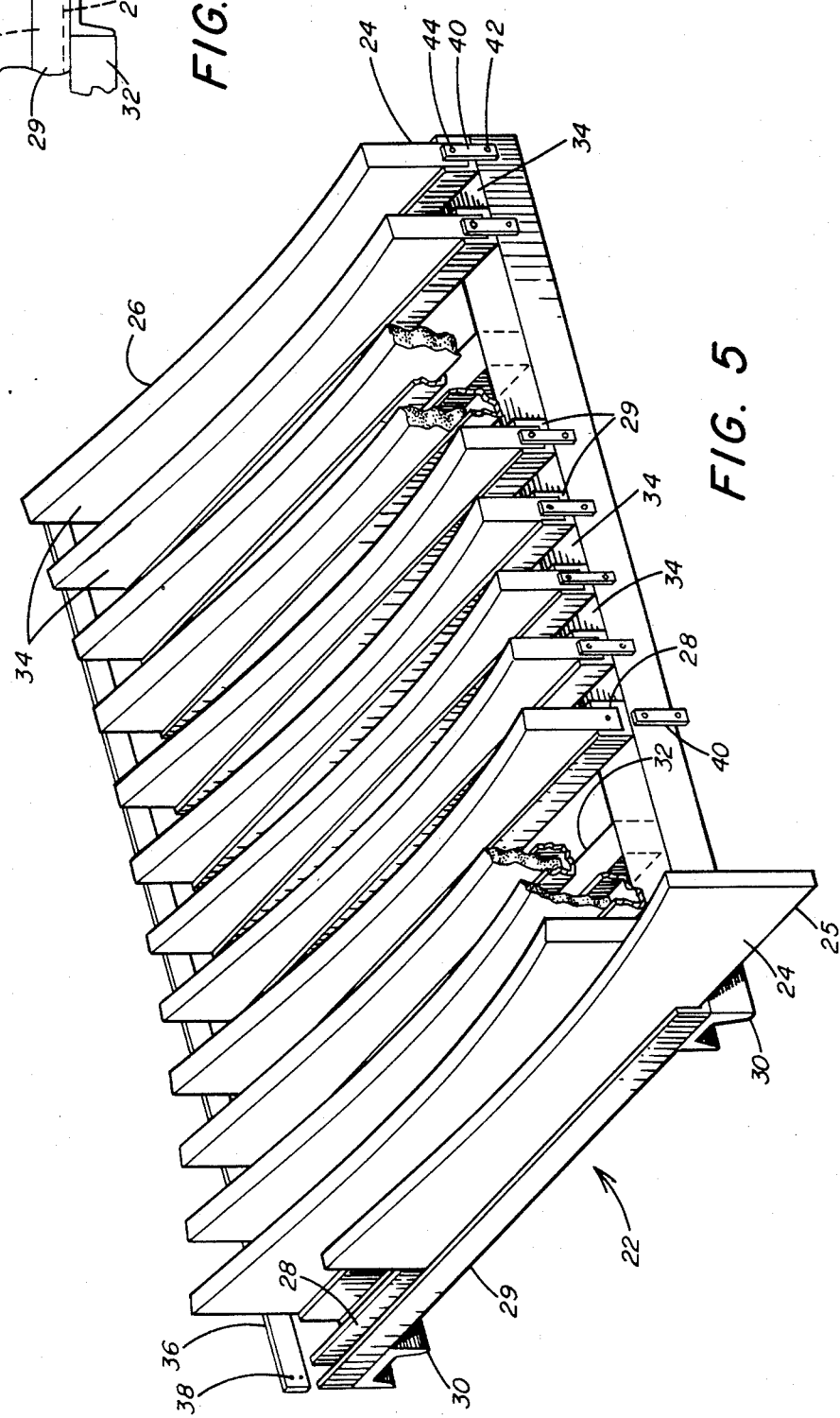

METHOD AND APPARATUS FOR SHAPING GLASS SHEETS TO COMPLICATED SHAPES

BACKGROUND OF THE INVENTION

The present invention relates to the shaping of glass sheets and particularly to the shaping of glass sheets supported horizontally using a technique known by various terms, such as a horizontal press bending process, drop forming, and sag bending, in which a glass sheet is supported by a vacuum holder and transferred from the vacuum holder to a ring-like member that transports the glass sheet from a shaping station into a cooling station where a desired degree of temper is imparted to the shaped glass.

DESCRIPTION OF TECHNICAL PROBLEMS AND PATENTS OF INTEREST

Glass sheets shaped to the configurations required for windows in automobiles have been mass produced at high rates by apparatus that conveys glass sheets in series while supported in a generally horizontal orientation through a tunnel-type furnace on one of several types of conveyors, such as roller conveyors or gas hearth type conveyors. During its passage through the furnace, each glass sheet in turn is heated to a temperature approaching the glass softening point. When the glass sheet reaches the proper temperature, either within the downstream end of the furnace or beyond the furnace exit, each glass sheet is brought into engagement with a vacuum holder, an outline ring-like member is shuttled into a position below the vacuum holder from a cooling area to receive a glass sheet from the vacuum holder and support the glass sheet near its peripheral margin for conveyance into the cooling area. The glass sheet is transferred from the shuttling ring-like member onto a removal conveyor and the ring-like member is returned to a position adjacent the vacuum holder to await the arrival of a succeeding glass sheet into a position of engagement with the vacuum holder.

Prior to the present invention, efforts to shape glass sheets to sharp bends using complementary shaped press bending molds have been limited to those that operated without a vacuum holder. For example, U.S. Pat. No. 4,056,379 to Kelly and Gibson heats an elongated strip of glass to be shaped to a sharp bend more intensely than the remainder of the glass sheet during the heating prior to the shaping of the glass sheet by applying a line of electroconductive coating material to a surface of the sheet and contacting the ends of the electroconductive line with electrodes between which a voltage is applied. The differentially heated glass sheet is then subjected to sandwiching between a pair of molds of complementary shape.

In U.S. Pat. No. 4,074,996 to Hegedorn, Rahrig and Revells, a horizontal press bending apparatus is disclosed in which an upper side end engaging mold member is pivotally supported from above a frame that supports an upper complementary mold member of a pair of pressing molds.

U.S. Pat. No. 4,203,751 to Roth, Siemonson, Schmidt and Peters press bends a glass sheet to a sharp bend near each extremity using sectionalized press bending molds of complementary shape that are jointed near each axis of sharp bending.

U.S. Pat. No. 4,210,435 to Claassen and U.S. Pat. No. 4,210,436 to Imler disclose press bending molds in which a heated pipe or rod is heated either by electric resistance or by burning gas to help develop an elongated line of sharp bending in glass sheets to be press bent to a shape that comprises a sharp angle bend.

U.S. Pat. No. 4,305,746 to Hegedorn, Revells and Bushong discloses a horizontal press bending apparatus for shaping horizontally supported glass sheets in which an end of the upper mold is pivotally supported from a support above and to the side of the upper mold to engage the end portion of a glass sheet to help sandwich the glass sheet between itself and a complementary portion of an upwardly lifted lower shaping mold to help form a sharply bent end portion of a glass sheet by press bending.

U.S. Pat. No. 4,312,661 to Hegedorn and Revells discloses a horizontal press bending apparatus for shaping glass sheets to shapes that incorporate end portions that are bent to the mirror image of one another by introducing means to coordinate the movement of end shaping members forming part of the lower press bending mold of a pair of pressing molds to develop the sharp bends of equivalent shape for the opposite ends of a glass sheet simultaneously.

None of the patent disclosures utilize a vacuum holder in the shaping of glass sheets to a sharp bend.

Patents showing the use of vacuum holders in the shaping of glass sheets include U.S. Pat. No. 3,806,312 to McMaster, U.S. Pat. No. 3,846,104 to Seymour, U.S. Pat. No. 4,092,141 to Frank and Lampman, U.S. Pat. Nos. 4,277,276 and 4,297,118 to Kellar and Pereman, U.S. Pat. No. 4,300,935 to Seymour and U.S. Pat. No. 4,331,464 to Claassen and Ewing. U.S. Pat. No. 4,282,026 to McMaster, Nitschke and Nitschke discloses in FIG. 12 spaced lifters 148 supported at their ends by lifter bars 150 forming an open frame-like support. The lifters move upwardly between adjacent conveyor rolls 68 to lift glass sheets from the conveyor rolls into proximity to a vacuum holder 92 within a shaping station located within a heating furnace. The temperature of the glass sheet at the shaping station of this patent is so high that there is danger of the solid members (lifters and vacuum holder) damaging the surfaces of the engaged glass sheet and to cause unwanted excessive sag upon subsequent transfer of the glass sheet from the vacuum holder 92 to a ring-like member 168 that carries the glass sheet to a cooling station. When solid members such as the lifters and the vacuum holder engage the glass sheet outside the furnace after a brief period of exposure to the less hot atmosphere outside the furnace, the major surfaces of the glass sheet are less likely to deform when engagement with said solid members is delayed until the surfaces harden somewhat. However, care must be taken to engage the glass sheet before the core temperature is reduced to below the deformation temperature of the glass sheet. Under these circumstances, glass sheets sometimes fracture and the fragments must be removed to avoid damage to the surface of a succeeding glass sheet. These patents are examples of many others that disclose the use of vacuum holders to shape glass sheets to various shapes, none of which provide a sharp bend, namely, one having a radius of less than about 8 inches (20 cm).

SUMMARY OF THE INVENTION

The present invention provides method and apparatus for bending glass sheets to complicated shapes including an end portion bent sharply relative to a main portion. Apparatus conforming to this invention incorporates a vacuum holder and also includes movable means in the form of a shaping rail to help impart a sharp localized bend to a glass sheet undergoing shaping by such apparatus. The movable shaping rail is supported by support and movement actuation means that keep the shaping rail clear of a glass sheet path of movement into vacuum engagement with the vacuum holder until such time as the shaping rail is caused to engage the end portion of the glass sheet that requires sharp bending. In the method of this invention, the main portion of a hot glass sheet is held in vacuum engagement against the main portion of the shaping surface defined by the vacuum holder to assume the shape of the main portion of the vacuum holder, then the shaping rail engages the end portion of the hot glass sheet to sandwich the latter against a corresponding end portion of the vacuum holder while vacuum is still applied to the vacuum holder.

In a preferred embodiment of this invention, the shaping station is located just beyond the furnace in an open atmosphere. The glass sheet is thus exposed to an atmosphere having a temperature lower than furnace temperature for a brief period on the order of a fraction to several seconds before the glass sheet is lifted from the conveyor rolls into vacuum engagement with the vacuum holder. Under such circumstances, the surface temperature of the glass sheet cools sufficiently to harden and withstand local deformations on engagement with solid shape-imparting members while the core of the glass sheet remains sufficiently high to enable the glass sheet to deform. Another aspect of patentable subject matter involves the use of the openings between adjacent slats of a lower pressing mold that communicate with an enlarged space beneath said openings facilitate removal of glass fragments from the solid glass engaging elements located at or beyond the shaping station. Ready access is provided to said enlarged space to enable the latter to receive additional fragments.

The benefits of the present invention will be understood more clearly in the light of a description of a preferred embodiment that follows.

BRIEF DESCRIPTION OF THE DRAWING

In the drawings that form part of the description of a preferred embodiment of the present invention.

FIG. 5 is a perspective view, with parts omitted, of a lower press bending mold incorporated in the preferred embodiment of apparatus according to the present invention with an end element partially disassembled; and FIG. 6 is a fragmentary elevational view of an end portion of the mold shown in FIG. 5 with the disassembled end member of FIG. 5 in place when the mold is assembled in operating condition.

DESCRIPTION OF THE PREFERRED EMBODIMENT

Figure 1:
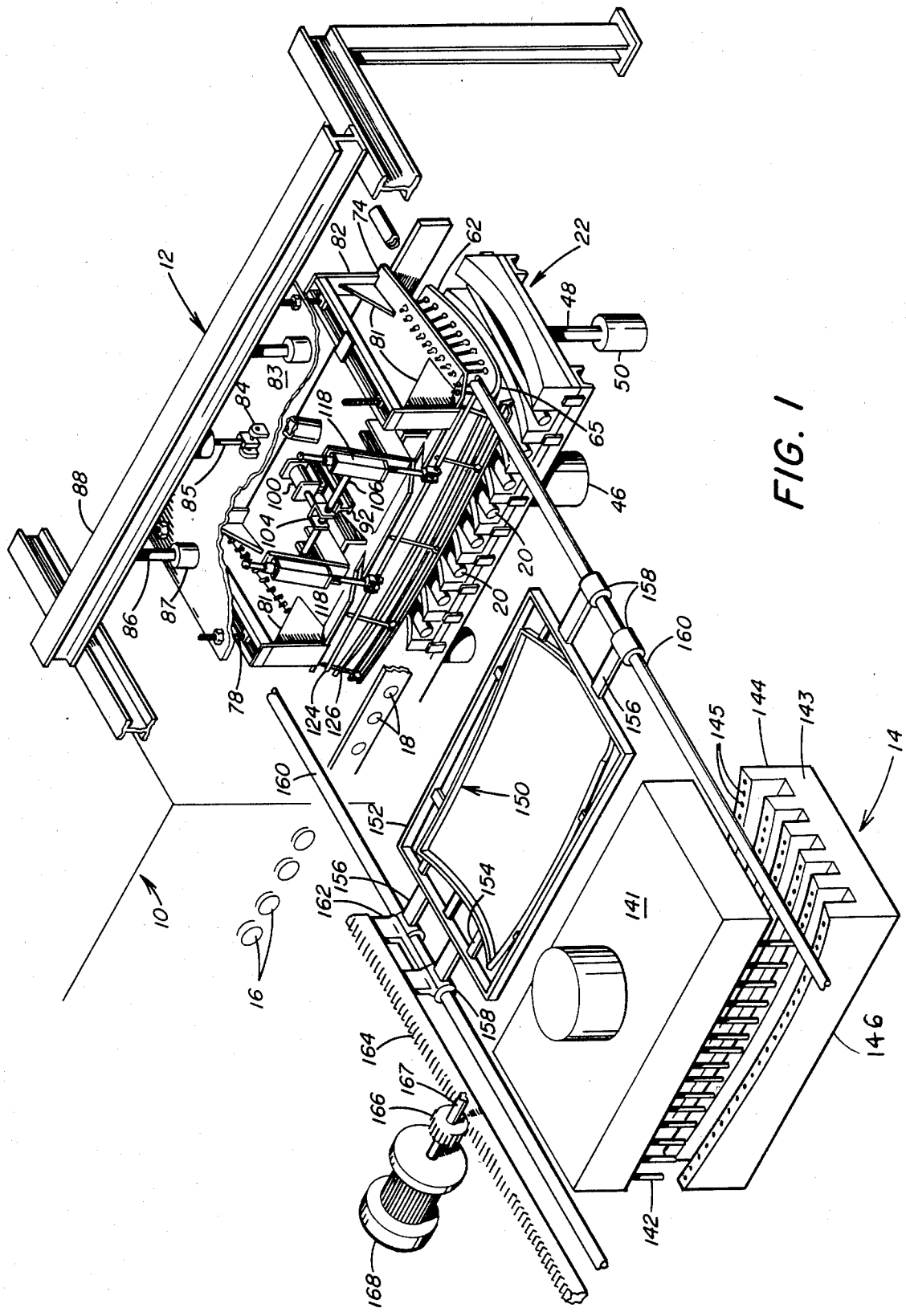
FIG. 1 is a perspective view, with parts omitted, of a preferred apparatus embodiment to shape and temper glass sheets according to the present invention.
Figure 2:
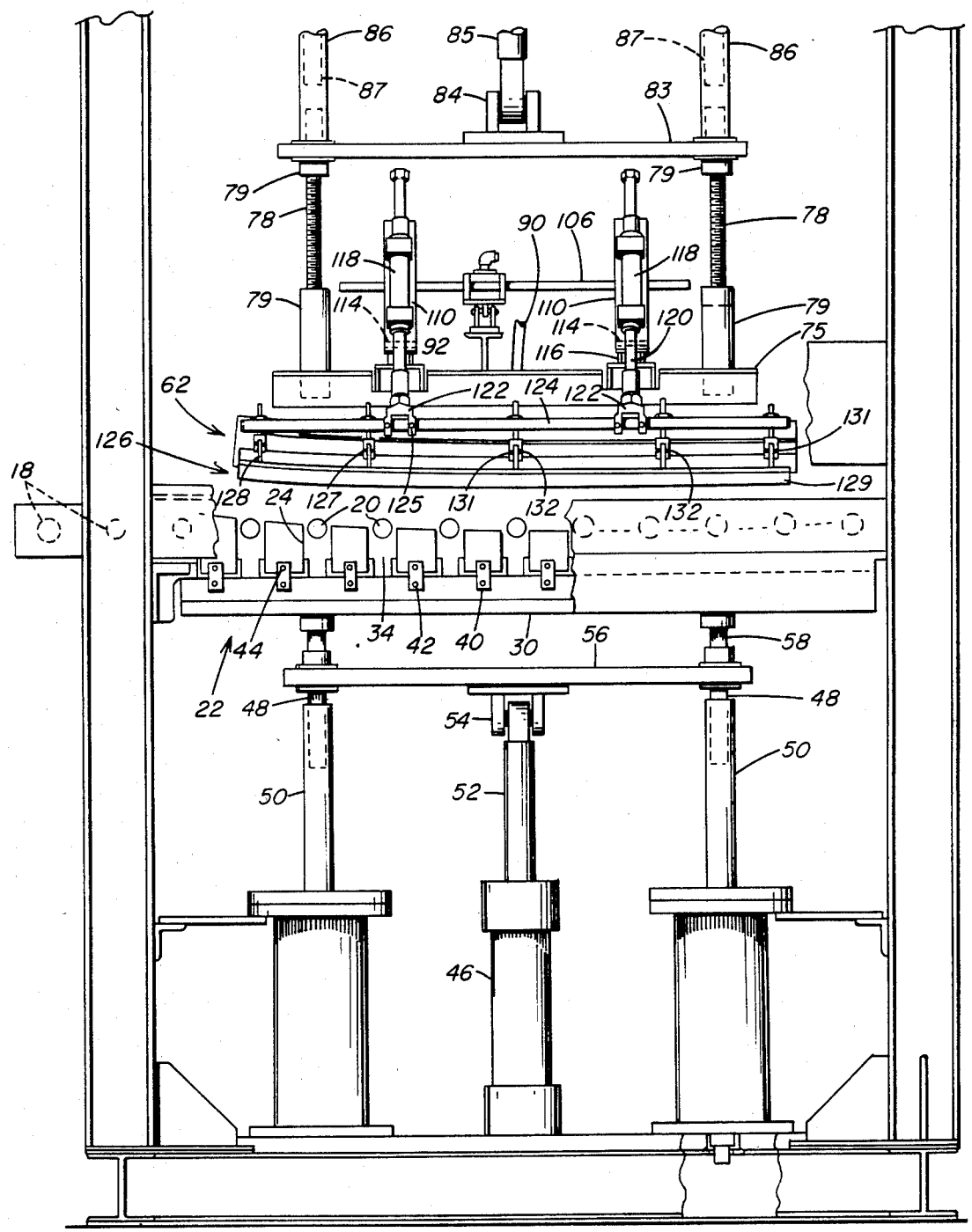
FIG. 2 is a side elevational view, with parts omitted, of said apparatus conforming to the present invention.

A typical preferred embodiment of the present invention comprises a tunnel-type furnace 10, a shaping station 12 and a cooling station 14 located in consecutive locations along a path traversed by a glass sheet to be bent and at least partially tempered.

While the path illustrated has a perpendicular change of direction at the shaping station 12, this change of direction is not necessary to practice the present invention. The path of glass sheet travel may be either a straight line path through the furnace 10, the shaping station 12 and the cooling station 14 or the path may change directions with a vertical or horizontal component or both without departing from this invention.

The furnace 10 comprises a plurality of furnace conveyor rolls 16. The furnace conveyor rolls extend transversely across the width of the furnace and are longitudinally spaced from one another along the length of the furnace from a furnace entrance (not shown) to the exit end of the furnace. Immediately beyond the furnace exit and in alignment with the furnace conveyor rolls 16 are a plurality of transfer rolls 18. The latter also extend transversely of the path of movement and their common upper tangent provides a continuation of the horizontal plane of support for glass sheets that are moved by friction over the rotating furnace conveyor rolls 16 and transfer rolls 18. Additional shaping station rolls 20 are disposed in alignment with and in longitudinally spaced relation with one another and with the transfer rolls 18 to form a continuation of a conveyor roll system that transports a series of glass sheets through the furnace 10 and into the shaping station 12 along a path of travel. In this description, the terms "longitudinal" and "transverse" will be used relative to said path of travel from said furnace 10 to said shaping station 12.

A system for controlling the rate of rotation of the furnace conveyor rolls 16, the transfer rolls 18 and the shaping station rolls 20 is incorporated in the preferred embodiment. The furnace is also provided with heaters in the form of either gas burners or electrical radiant heaters or by a combination of both, which heat supply means are well known in the art. The rolls of the conveyor are arranged in sections and their rotational speed controlled through clutches (not shown) so that the speed of the different conveyor sections may be controlled and synchronized in a manner well known in the art. A glass sensing element (not shown) is located near the exit of the tunnel-type furnace 10 to initiate a cycle of operation intended to move a glass sheet into a position of alignment at the shaping station 12 for a shaping operation, which will be discussed in more detail later.

Typical rolls used within the furnace are fused silica rolls provided with metal end caps. U.S. Pat. No. 4,242,782 to Hanneken and Marriott disclose superior rolls for this furnace environment and reference may be made to their description in this patent for further details, which is incorporated in this specification by reference. Typical rolls used as transfer rolls 18 and shaping station rolls 20 are steel shafts surrounded by fiber glass sleeves.

The shaping station 12 comprises a slatted lower pressing mold 22. With special reference to FIGS. 5 and 6, the mold 22 comprises a plurality of shaped slats 24 having straight bottom edges 25. The slats 24 have curved upper edges 26 conforming to the shape desired to be imparted to a glass sheet to be lifted from said position of alignment on the plurality of shaped slats. The shaped slats 24 are received in transverse grooves 28 formed along the length of a plurality of transverse channel members 29 spaced longitudinally of the shaping station 12.

A pair of inverted longitudinal channels 30 extend beneath the opposite ends of the transverse channel members 29 to support the latter. Several spaced cross braces 32 interconnect the longitudinal channels 30 in positions directly beneath those occupied by selected transverse channel members 29. The transverse channel members 29, the inverted longitudinal channels and the spaced cross braces provide an open support frame.

The transverse channel members 29 are longitudinally spaced from one another to provide transversely extending clearance openings 34 between adjacent transverse channel members 29 and their supported shaped slats 24. With this open construction, the lower bending mold is provided with spaced passages providing an open area between adjacent shaped slats through which fragments of glass may fall onto an enlarged opening therebeneath which provides a readily accessible cullet receiving station (not shown) beneath the shaping station 12. Whenever a glass sheet fractures at or beyond the shaping station 12 outside the heating furnace 10, sufficient clearance space is provided for the glass fragments to fall into the cullet receiving station and be readily removed therefrom without having residual glass fragments interfere with the operation of rolls 20 or remain on the upper curved edges 25 of the slats 24, which could scratch later arriving glass sheets.

The end slats 24 are attached at one end to an apertured tie bar 36 which extends the entire length of the lower pressing mold 22. Screws 38 extend through the apertures at the left end of the tie bar 36 to secure the left end slat 24, as in the view depicted in FIG. 5. A similar pair of holes and screws is provided at the other end of the apertured tie bar 36 to secure to the right end slat 24 at the right end of the slotted lower pressing mold 22. The front end of each of the shaped slats 24 is locked in place by a pivotal two-hole bar 40 provided with a pivot screw 42 through a first pivot hole that attaches the two-holed bar 40 to the inverted front longitudinal channel 30. A locking screw 44 is applied through the other aperture of the two-hole bar 40 to secure the two-hole bar to the adjacent end of a corresponding shaped slat 24 and form a corresponding hole therein.

The corresponding holes in each slat 24 and bar 40 that receive each pivot screw 42 are located in such positions that clearance is provided to slide a slat 24 along a transverse path provided by the transverse channel member 29 in which the slat is fitted when the bar 40 is pivoted to hang down. Therefore, whenever it becomes necessary to alter the apparatus for use in handling a different production pattern, it is necessary merely to unscrew the screws 38, to separate the apertured tie bar from one end of the lower pressing mold 22 and to loosen each of the locking screws 44 to permit the pivotable two-hole bars 40 to pivot into the hanging position so that the shaped slats 24 corresponding to one production pattern can be removed and new set of shaped slats corresponding to a different production pattern can be readily substituted, and then locked in place.

The inverted longitudinal channels 30, the spaced cross beams 32 and the spaced transverse channel members 29 form an open reinforcement frame for supporting the slots 24 of the lower pressing mold 22. Means is provided to move the slotted lower pressing mold 22 vertically as needed during a glass sheet shaping operation. The transversely extending clearance openings 34 are aligned with the shaping station rolls 20 so as to permit clearance for raising and lowering the slotted lower pressing mold 22 between a recessed lower position entirely beneath rolls 20 to provide clearance for conveying a glass sheet into the desired position of alignment and an elevated position supporting the glass sheet in vertically spaced relation to rolls 20. The means for raising and lowering the lower slotted pressing mold 22 in the illustrated embodiment comprises a lower piston housing 46 oriented vertically and a pair of vertical guide rods 48 supported in vertical guide sleeves 50. A lower piston rod 52 which extends upwardly from the lower piston housing 46 terminates at a clevis 54. The latter is connected to a lower frame support 56, which, in turn, is connected through connecting elements 58 to the open reinforcing frame for the slotted lower pressing mold 22 provided by the inverted longitudinal channels 30 and the spaced cross braces 32.

Returning again to FIGS. 1 to 4, the illustrative embodiment of the present invention further comprises an upper vacuum holder 62. The latter has an apertured bottom wall 64 provided with an elongated end area 65 bent sharply relative to the main portion thereof and which is also apertured like the main portion of the bottom wall 64. The vacuum holder 62 also has an upper wall 66 having an elongated end area 67 approximately parallel to elongated end area 65. Walls 64 and 66 are kept in spaced relation to one another through a peripheral spacer wall 68. The latter cooperates with walls 64 and 66 to enclose a chamber 69 within the upper vacuum holder 62.

A flexible cover 70 (FIG. 4), preferably of knit fiber glass cloth, covers the apertured bottom wall 64 of the upper vacuum mold 62. The cover 70 is connected by suitable connecting means 72 such as a plurality of clamps, to whatever structure is convenient for clamping an extended peripheral portion of the cover 70 so as to have the cover remain in unwrinkled condition against the downwardly facing surface of the apertured bottom wall 64 of the upper vacuum holder 62. From FIG. 3, the transverse dimension of the vacuum holder 62 is shown to extend to the left beyond the corresponding left transverse end of the shaped slats 24. This feature is helpful to obtain extremely sharply bent end portions, but is not required for sharply bent end portions of less severity. Another feature useful to promote a sharply bent end portion comprises having the end portions of the upper curved edges 25 of slightly shallower curvature than that of the corresponding portion of the lower apertured wall 64 adjacent elongated end area 65. For extremely sharp end bends, both features should be incorporated.

A plurality of connecting means in the form of threaded bolts 73 interconnect the upper wall 66 of the upper vacuum holder 62 to a reinforcing plate structure 74 and its bent end portion 75 to reinforce vacuum holder 62. To accomplish this spaced reinforcement, the plurality of connecting means in the form of threaded bolts 73 are interconnected between a plurality of alignment nuts 76 mounted on the upper surface of the upper wall 66 and corresponding alignment sleeves 77 mounted on the lower wall of the reinforcing plate structure 74 and its bent end portion 75. A plurality of lock nuts 80 is provided, one for each threaded bolt 73, to secure the upper vacuum mold 62 in spaced relation to the reinforcing plate structure 74 and its bent end portion 75. A plurality of reinforcing gussets 81 is provided to further reinforce the reinforcing plate structure 74 by direct connection to an upper support structure 82.

Figure 3:
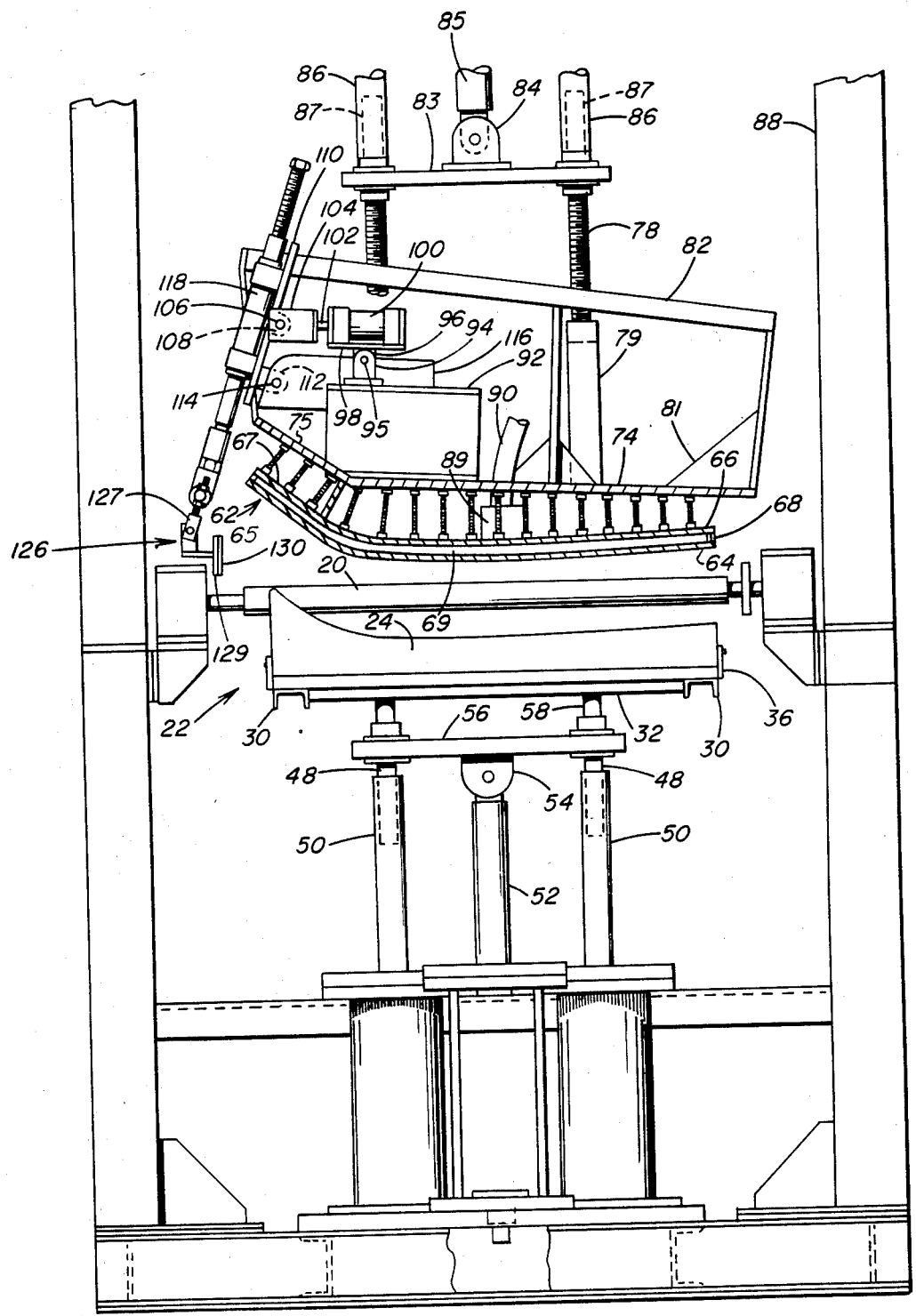
FIG. 3 is a sectional view taken at right angles to the end view of FIG. 2.
Figure 4:
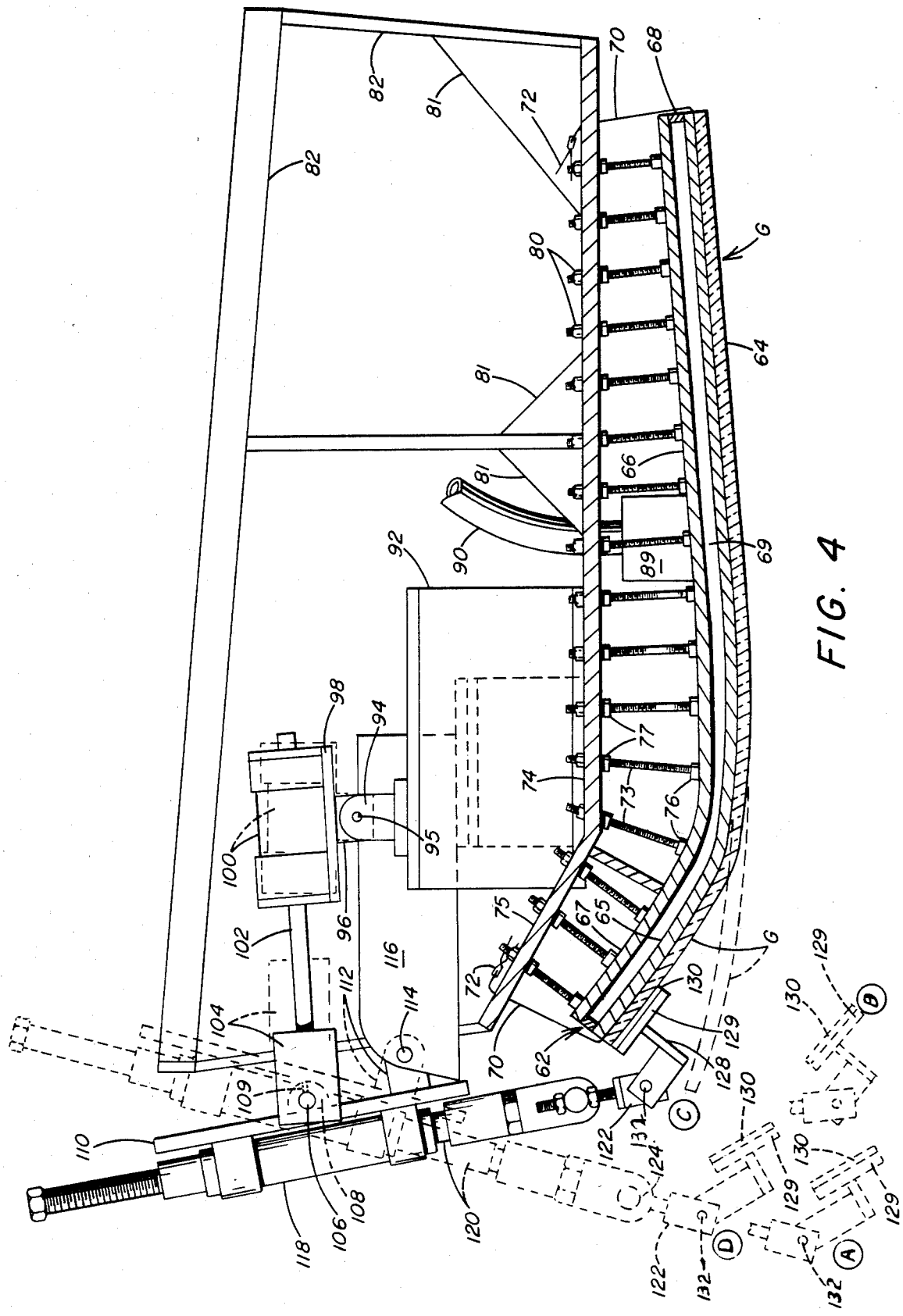
FIG. 4 is an enlarged view, similar to the view of FIG. 3, showing certain structural elements of the apparatus embodying this invention.

The upper support structure 82 also comprises an upper table 83 (FIG. 3). The latter is supported from the reinforcing plate structure 74 through a plurality of externally threaded shafts 78 and internally threaded sleeves 79. An upper clevis 84 is mounted on the upper surface of the upper table and in turn is connected to the lower end of an upper piston rod 85. The apparatus also contains a plurality of upper guide rods 86 which receive vertical guide sleeves 87 mounted on the upper surface of upper table 83. The cylinder for the upper piston rod 85 is attached to upper main support structure 88 for the apparatus, as are the upper guide rods 86.

Mounted to the upper wall 66 of the vacuum holder 62 is a vacuum or pressure plenum 89 (FIGS. 3 and 4) in communication with the chamber 69 within the vacuum holder 62. A vacuum or pressure hose 90 communicates between the vacuum or pressure chamber 89 and a source of vacuum or air under pressure (not shown).

An I-beam 92 fixed to reinforcing plate structure 74 supports a pivot bracket 94. The latter has a pivot pin 95 (see FIGS. 3 and 4). A tongue 96 is pivotally supported on the pivot pin 95 relative to pivot bracket 94. A main piston plate 98 (FIG. 4) is connected to the tongue 96 and forms a T-connection therewith. The main piston plate 98 supports a double ended main piston 100 having a main piston rod 102 which is connected to a main piston clevis 104. An elongated rod 106 extends transverse to the clevis 104 and engages a pair of upper ears 108, each of which has a set screw 109 to clamp it to rod 106 for rotation therewith. Each ear 108 is supported on a corresponding plate 110. The plates 110 also support a pair of lower ears 112 provided with a pin 114 to pivot the lower ears 112 relative to mounting brackets 116.

A double ended piston 118 is fixed to each plate 110. Each piston 118 has a piston rod 120 that terminates in a clevis 122. A cross rod 124 extends through aligned apertures through the pair of clevises 122. The double ended pistons 118 are actuated in unison to move cross rod 124 when needed.

Set screws 125 are provided in internally threaded apertures on the clevises 122 to lock the orientation of the cross rod 124 relative to the clevises 122. The set screws are loosened whenever it is desired to change the orientation of the cross rod 124 for reasons that will be obvious from a discussion that follows.

The cross rod 124 supports a shaping rail support assembly 126. The latter comprises a plurality of support assembly clevises 127 fixed for rotation with rod 124, and tabs 128. The tabs 128 are connected to a metal shaping rail 129. Shaping rail 129 has a surface shaped to conform to that of the corresponding end area 65 of the vacuum holder 62. The surface is provided with a glass engaging cover 130 of soft, insulating material that does not mar hot glass, such as a phenolic resin reinforced with aramid fibers. The support assembly clevises 127 are apertured to receive set screws 131 (FIG. 2) which engage stub shafts 132 that extend through aligned holes in the clevises 127 and tabs 128 to fix the orientation of the T-shaped metal shaping rail 129 and its glass engaging cover 130.

As will be explained later, the piston rods 102 and 120 are programmed to act in coordination with the actions of upper piston rod 85 and the lower piston rod 52 to avoid premature collision of the shaping rail 129 with the glass sheet undergoing shaping and vice versa. Also, the mechanism actuating cyclic movement of the shaping rail 129 is mounted on the support structure for the vacuum holder 62 in position to make such accidental collision unlikely. Furthermore, the relative dimensions of the vacuum holder 62 compared to the shaped slats 24 provide clearance for the shaping rail 129 to engage and lift a side end portion of a glass sheet G against the sharply bent elongated end area 65 without requiring retraction of the shaped slats 24. This feature is very important in fabricating shapes having an extremely sharply bent end portion.

The cooling station 14 comprises an upper plenum 141 provided with longitudinally spaced transverse rows of transversely spaced pipe nozzles 142 extending downward to direct cold air or other cold tempering medium applied under pressure to the upper plenum 141 toward the upper surface of a glass sheet that faces the bottom openings of the upper nozzles 142. End lower plenums 143 communicate with lower, longitudinally spaced, bar type nozzle housings 144 disposed with thick walls extending vertically. Elongated openings 145 directed upward through the vertical thickness of the nozzle housings 144, so that cold air or other cold tempering medium applied under pressure to the lower plenums 143 is directed upward through the elongated openings 145 against the lower major surface of the glass sheet for escape between the lower bar-type nozzle housings 144 onto an enlarged bottom space 146, which provides ready access to remove cullet in case of glass breakage.

The openings of the lower bar type nozzle housings oppose corresponding openings in the upper pipe nozzles 142. The bar type nozzle housings 144 are spaced vertically below the upper pipe nozzles 142 to provide clearance for moving a ring-like member 150 along a path between the upper nozzles and the lower nozzles. The lower ends of the upper rows of nozzles are located along a curved surface complementary to the curved shapes of the upper smooth surfaces of the bar type housings for the lower nozzles to provide a curved clearance space therebetween conforming to the transverse shape of the glass sheets conveyed therebetween.

If desired, the plenums 141 and 143 may be sectionalized along the length of cooling station 14 to provide different air pressures into the various sections of the upper plenum and/or the lower plenum so as to provide a program of air blasts along the length of the cooling station 14 so as to provide a cooling cycle of desired intensity of cooling.

Means may be provided to pivotally support the lower plenum 143 so as to facilitate the removal of cullet in case glass fragments are formed in the cooling station. Typical apparatus to pivot a lower set of nozzles is found in U.S. Pat. No. 3,846,106 to Seymour, the description of which is incorporated herein by reference to avoid making the present description unduly prolix.

The ring-like member 150 has a shape conforming generally to the outline of the glass sheet that is to be conveyed from the desired alignment position within the shaping station 12 into the cooling station 14. Preferably, the ring-like member 150 is constructed in the manner depicted in U.S. Pat. No. 3,973,943 to Seymour and comprises a metal reinforcing rail extending in the form of a ring-like structure disposed edgewise with its width forming the height of the rail attached for reinforcement to a series of non-metallic bars or bar portions formed from cutting a board of non-metallic electrical insulator material that does not mar or harm the glass sheet on contact therewith during the treatment imposed on the glass and on the ring-like member during its transfer between the shaping station 12 and the cooling station 14. The ring-like member 150 is attached to a surrounding reinforcing frame 152 in spaced relation thereto by spaced connecting members 154 which are connected at their inner ends to the laterally outer surface of the metal rail of the ring-like member 150 and at their outer ends to the inner surface of the reinforcing frame 152.

The insulating material for the non-metallic bar or bar portions of the ring-like member 150 may be composed of a series of fiber glass layers bonded together with an epoxy resin believed to be a highly cured methyl phenyl silicone or, more preferably, a phenolic resin reinforced with aramid fiber as disclosed in copending U.S. patent application Ser. No. 341,975 of Fecik, Ewing and Mates, filed Jan. 22, 1982. The bar portions have a low heat conductivity and are of a low expansion material and are approximately 3 millimeters thick. Each of the non-metallic bar portions has a desired shape conforming to the shape of a different portion of the metal rail except that the vertical heights of the bars are higher than the height of the metal rail. Each bar is secured to the inner surface of the rigid metal rail so that it is coextensive with the entire width of the reinforcing metal rail and has a short upper portion extending beyond its reinforced lower portion.

The upper edge of the non-metallic bar portion disposed above the upper edge surface of the reinforcing metal rail provides an upper edge surface for the ring-like member 150 in spaced relation to the reinforcing metal rail, so that when glass is deposited on the ring-like member, it makes contact only with the non-metallic glass engaging means provided by the bar portions. The elevation of the glass supporting surface of the bar portions above the upper edge of the rigid reinforcing metal rail is preferably sufficient to provide a path of heat conduction through the non-metallic bar portions of sufficient length to cause minor detrimental effects only, if any, in the cooling of the glass contacting portion; yet, the unreinforced portion is not so wide as to endanger the structural strength of the non-metallic bar portions.

A pair of outwardly extending ears 156 having sleeves 158 at their laterally outer ends is connected to the outer surface of the reinforcing frame 152. The sleeves 158 slide around tracks 160. On each side of the ring-like member 150, the sleeves 158 are provided with vertical ear extensions 162. The latter are fixed to the bottom of one or another of a pair of elongated racks 164 (only one of which is shown). A pinion gear 166 driven through a common shaft 167 by a pinion gear drive motor 168 meshes with the upper surface of each rack 164 to cause the ring-like member 150 to move between a position within the shaping station below the position occupied by a glass sheet engaged by vacuum against the upper vacuum mold 62 and a position between the upper plenum 141 and lower plenum 143 and a still further position downstream of the cooling station 14 where the glass sheet may be unloaded from the ring-like member 150 and the latter returned to a position at the shaping station 12. The drive motor 168 is reversible to reciprocate the ring-like member 150 when a glass sheet thereon is between the upper plenum 141 and the lower plenum 143 during application of tempering medium therethrough to avoid iridescence in the glass sheet.

CYCLE OF OPERATION

Glass sheets are mounted in series for conveyance along the path extending through the tunnel-type furnace 10. Friction of the rotating furnace conveyor rolls 16 drives the supported glass sheets through the length of the furnace. During their transit through the furnace 10, the glass sheets are heated to a temperature sufficient for shaping and tempering. At the exit end of the furnace 10, a sensing element senses the presence of the glass sheet and actuates a timer controller circuit. The latter causes the portion of the conveyor comprising the transfer rolls 18 and the shaping station rolls 20 together with sufficient of the furnace conveyor rolls 16 supporting a glass sheet or a row of glass sheets to insure that the entire length of the glass sheet or sheets is being engaged simultaneously are caused to rotate rapidly and then decelerate in unison until the glass sheet moves onto shaping station rolls 20 in position intermediate the upper vacuum holder 62 and the slotted lower pressing mold 22.

When the glass sheet is in the position desired while decelerating, piston rod 52 for vertical piston 46 is extended upward to raise the slotted lower pressing mold 22 so that the clearance openings 34 extend upward into the positions occupied by the shaping station rolls 20 and the shaped upper edges 26 of the shaped slats 24 lift the glass sheet into a position adjacent the vacuum holder 62. As an alternative, piston 85 can be extended downwardly simultaneously to lower the vacuum holder 62 toward the upper surface of the rising glass sheet.

Vacuum is applied to the chamber 69 through the plenum 89 and the vacuum hose 90 so that the major portion of the glass sheet is held by suction against the major surface of the downward facing bottom apertured wall 64 of the upper vacuum holder 62 when the glass sheet G is close enough to the bottom apertured wall 64 to promote vacuum engagement. It is noted that, at this stage of the shaping cycle, the end portion of the glass sheet to be sharply bent has not come into engagement as yet with the corresponding elongated end area 65 of the bottom wall 64. At this portion of the cycle, the metal shaping rail 129 is located at the phantom position depicted by the letter A in FIG. 4 or has begun moving toward the phantom position depicted by the letter B.

The main portion of the glass sheet is engaged against the main portion of the lower wall 64. Then, main piston 100 extends its rod 102 to the left to pivot the lower ears 112 for piston housings 118 about pivot pins 114 to move the covered metal shaping rail 129 and its cover 130 into a second position indicated by the letter B. At this time or simultaneously with movement of the piston rod 102, piston rods 120 for the double ended pistons 118 are retracted upwardly to bring the covered metal shaping rail 129 into engagement against the unsupported side portion of the glass sheet and force the glass sheet portion into both pressurized and vacuum engagement with the corresponding apertured end area 65 of the apertured bottom wall 64 of the upper vacuum mold 62. This portion of the shaping cycle is shown in full lines by the letter C in FIG. 4.

The glass sheet is held against the bottom wall 64 including its apertured end area 65 for a short interval of a fraction to several seconds until the shape is completed. The duration of the holding step depends upon the severity of the bend to be imparted to the end portion of the glass sheet that is engaged by the shaping rail 129. Vacuum is continued through the vacuum holder 62 while the covered shaping rail applies pressure to sandwich the end portion of the glass sheet G against the corresponding end area 65 of the vacuum holder 62.

When the shape has been obtained, piston rod 102 is retracted to cause the piston housings 118 and their associated rods 120 to pivot into the upper retracted position depicted by the letter D. The vacuum is disconnnected from the vacuum plenum 89 and air under pressure may be directed therethrough and into the chamber 69 to help remove the glass sheet G from engagement against the apertured bottom wall 64. However, before the vacuum is removed, the ring-like member 150 must be in a position of alignment beneath the glass sheet G so that the shaped glass sheet will drop onto the ring-like member 150 and be supported adjacent its peripheral edge on the shaped ring-like member 150 for support during its transit to the cooling station 14.

Piston rods 120 are again extended at this time to enable shaping rail 129 to resume the position depicted by the letter A to await the next shaping cycle. Suitable interlocks well known in the art are provided as part of any well known programmable controller, such as sold under the names of Modicon and Eptak, to cycle the moving parts properly and avoid collisions or improper timing of glass sheet release. It is understood that these controllers may actuate piston rods 102 and 120 in such a sequence as to move the shaping rail 129 from the position depicted by letter A to the solid line position without passing through position B.

The ring-like member 150 and its supported glass sheet is then moved into position between the upper plenum 141 and the lower plenum 143 by actuation of the motor 168 that rotates the pinion gears 166 to engage the racks 164 and move the structure attached to the racks 164 which includes ring-like member 150 into the cooling station 14. After the glass has been cooled sufficiently to impart a desired temper, the ring-like member is moved downstream into an unloading station (not shown), the glass sheet is removed from the ring-like member and the ring-like member returned through the cooling station to a position near or at the shaping station to await the engagement of the next glass sheet with the vacuum holder 62. The lower piston 46 is actuated to retract the lower pressing mold 22 so that the shaping station rolls 20 are free to receive the next glass sheet transferred from the furnace conveyor rolls 16 through the transfer rolls 18 onto the shaping station rolls 20 prior to the lifting of the lower piston rod 52 to raise the lower pressing mold 22 and its aligned glass sheet into vacuum engagement against the apertured bottom wall 64 of the vacuum holder 62.

The structure for supporting the T-shaped metal shaping rail 129 during its cycle of movement is so constructed and arranged to minimize interference to operators working on the apparatus. Furthermore, there is minimum interference with the motion of the glass sheet or the moving elements that bring the glass sheet upward from their support on the shaping station rolls 20 to support on the curved upper edges 26 of the shaped slats 24 of the slotted lower pressing mold 22 and into partial engagement with the vacuum holder 62 with further engagement being completed by bringing the movable shaping rail 129 into pressurized engagement enhanced by vacuum engagement against the portion of the glass sheet that remains to be engaged against the corresponding area 65 of the apertured bottom wall 64 of the vacuum holder 62 and furthermore provides means to provide clearance to permit the glass sheet to be released from vacuum engagement against the vacuum holder 62 and to be dropped onto the upper edge surface of the ring-like member 150 for transit from the shaping station 12 to the cooling station 14. Likewise, the structure described is constructed and arranged to avoid any collision between the moving shaping rail 129 and the shuttling ring-like member 150.

The embodiment just described is especially designed for shaping a glass sheet to a shape having an end portion along one side thereof bent sharply relative to the main portion thereof. It is understood that the present invention may be used to produce glass sheets having sharply bent end portions extending along opposite sides of a main portion thereof. In such a case, the vacuum holder is constructed of a shape conforming to the more complicated shape desired and is provided with a shaping rail along each of the opposite sides thereof to engage the opposite side or end portions of the glass sheet instead of engaging only the one side or end portion as in the illustrated embodiment described previously. In fact, it may even be desirable to add an elongated rail to hold an end portion opposite the sharply bent end portion against an opposite end area of the bottom wall 64 of the vacuum holder 62, particularly if the vacuum supplied to the vacuum holder is weak.

The description of this invention just completed is merely for the purpose of describing a preferred embodiment of the present invention and certain modifications thereof. It is understood that various other changes may be made without departing from the gist of the invention as defined in the claimed subject matter that follows.

We claim:

1. A method of bending a glass sheet to a shape having an end portion bent relative to a main portion of said glass sheet comprising:

heating said glass sheet to a deformation temperature;

drawing a vacuum through an apertured shaping surface of a vacuum holder, said apertured shaping surface having an apertured end area bent relative to a main area and substantially conforming to a shape desired for said glass sheet;

engaging said main portion of said glass sheet against said main area of said apertured shaping surface of said vacuum holder while said end portion of said glass sheet is unsupported and spaced from said end area of said shaping surface of said vacuum holder;

engaging said end portion of said glass sheet with a movable shaping rail to move said end portion of said glass sheet against said end area of said apertured shaping surface of said vacuum holder;

retaining said end portion and main portion of said glass sheet in vacuum engagement with said end area and main area of said shaped surface while said movable shaping rail biases said end portion of said glass sheet against said end area of said vacuum holder until said glass sheet conforms throughout its entire extent including said end area to the apertured shaping surface; and disengaging said end portion of said glass sheet and said shaping rail from one another while said end portion and main portion of said glass sheet are retained in vacuum engagement with said apertured shaping surface of said vacuum holder.

2. A method as in claim 1, wherein said apertured shaping surface of said vacuum holder faces downward to engage the upward facing surface of said glass sheet when the latter is oriented in an essentially horizontal orientation, comprising holding said shaping rail in a position clear of the path taken by said glass sheet en route to its engagement with said vacuum holder until said glass sheet main portion engages the corresponding main area of the shaping surface of said vacuum holder by vacuum, then lifting said shaping rail into engagement with said end portion of said glass sheet to move said end portion of said glass sheet against the corresponding end area of said apertured shaping surface of said vacuum holder.

3. A method as in claim 2, wherein, when said glass sheet disengages from said vacuum holder and said shaping rail, transferring said glass sheet to a ring-like member having an outline shape conforming to that desired for the corresponding portion of said glass sheet adjacent the marginal edge of said glass sheet, supporting said glass sheet on said ring-like member, transferring said ring-like member with said glass sheet supported thereon to a position intermediate cold blasts of tempering medium, and applying said blasts of tempering medium against the major surfaces of said glass sheet at a rate such that at least a partial temper is imparted to said glass sheet.

4. A method as in claim 2, comprising and bringing said heated sheet while at its deformation temperature into a position aligned with said vacuum holder while conveying said glass sheet on rotating rolls.

5. A method as in claim 4, comprising lifting said glass sheet on a plurality of slats having curved upper shaping surfaces to bring said glass sheet into vacuum engagement with said vacuum holder while said shaping rail is in said clear position.

6. A method as in claim 5, further comprising lowering said vacuum holder and drawing vacuum through said apertured shaping surface to engage said hot glass sheet by vacuum thereagainst, and lifting said vacuum holder with said hot glass sheet engaged by vacuum thereagainst to provide clearance for said ring-like member to enter the space between said vacuum holder and said rolls.

7. A method as in claim 6, comprising heating a series of glass sheets with a tunnel-type furnace, bringing each said hot sheet in turn to a position adjacent to but outside said furnace, whereby said sheet is liable to fracture on exposure to random cold currents and form glass fragments, and providing openings between adjacent of said slats and an enlarged space beneath said slats to collect said glass fragments in said enlarged space without interfering with the movement of said slats or of successive glass sheets during a bending cycle.

8. A method as in claim 6, comprising lifting said glass sheet by engaging the main portion thereof with said plurality of slats while said end portion thereof is free of engagement with any solid member to bring said main portion of said glass sheet into vacuum engagement with the main area of said vacuum holder.

9. A method as in claim 8, comprising heating said glass sheet to its deformation temperature within an enclosed heated atmosphere and applying said movable rail engagement and said vacuum engagement in an atmosphere cooler than said enclosed, heated atmosphere and outside of and adjacent to said enclosed heated atmosphere.

10. A method as in claim 9 wherein said movable shaping rail is a first movable shaping rail and said end portion of said glass sheet is a first end portion further including:
providing a second movable shaping rail in spaced relation to said first movable shaping rail;
holding said second shaping rail in a position clear of the path taken by said glass enroute to its engagement with said vacuum holder until said glass sheet main portion engages the corresponding main portion by vacuum;
engaging a second end portion of said glass sheet with said second shaping rail, said second end portion of said glass sheet spaced from said first end portion, to move said second end portion against a corresponding second apertured end area of said apertured shaping surface of said vacuum holder; and
retaining said second end portion of said glass sheet in vacuum engagement with said second end area of said shaping surface while said second movable shaping rail biases said second end portion of said glass sheet against said second end area of said vacuum holder until said glass sheet conforms throughout its entire extent including said second end area to the apertured shaping surface.

11. Apparatus for bending hot glass sheets comprising:
a shaping station having a vacuum holder with an apertured shaping surface having an apertured end area bent with respect to a main portion of said apertured shaping surface conforming to a shape desired for said glass sheet;
a shaping rail associated with said vacuum holder having a glass sheet engaging surface;
means to move said shaping rail away from said end area into a clear position to allow said glass sheet to be shaped to move into alignment with said vacuum holder;
means to provide relative motion between said glass sheet to be shaped and said vacuum holder to engage the main portion of said glass sheet against the corresponding main area of said vacuum holder; and
means to move said shaping rail toward said apertured end area into an engaging position to move said end portion of said glass sheet to be shaped against said apertured end area of said vacuum holder and maintain it thereagainst.

12. Apparatus as in claim 11, further including conveyor means for conveying said glass sheet as one of a series of glass sheets through said furnace and into said shaping station, wherein said vacuum holder is located above said conveyor means and has a downwardly facing apertured shaping surface, transfer means responsive to the entry of said glass sheet to a position along said conveyor means in alignment with said vacuum holder to transfer said glass sheet from said conveyor means to engagement by vacuum against said shaping surface of said vacuum holder.

13. Apparatus as in claim 12, further including means to support said vacuum holder in spaced relation to said position along said conveyor means for at least a portion of a bending cycle, a ring-like member, and means to move said ring-like member in an essentially horizontal direction between a first position between said vacuum holder and said position along said conveyor means when said vacuum holder is supported in spaced relation to said position along said conveyor means and a second position within a cooling station downstream of said first position.

14. Apparatus as in claim 13, wherein said transfer means comprises a lower pressing mold having spaced slats with curved upper edges separated by openings, said conveyor means comprises a conveyor roll aligned vertically with each of said openings and means to move said lower pressing mold between a recessed position wherein said curved upper edges are below said conveyor rolls and a raised position wherein said curved upper edges are above said conveyor rolls and in close enough proximity to said downwardly facing apertured shaping surface to engage the said glass sheet by vacuum when vacuum is applied to said vacuum holder.

15. Apparatus as in claim 14, wherein said transfer means also comprises means to lower said vacuum holder to the vicinity of said position along said conveyor means, means to apply vacuum to said vacuum holder to secure said glass sheet against said downwardly facing apertured shaping surface and means to raise said vacuum holder while said vacuum applying means is operating to engage said glass sheet against said downwardly facing apertured shaping surface.

16. Apparatus as in claim 14, wherein said shaping station is located downstream of and outside of said furnace, and said lower pressing mold is supported on an outline frame so that the openings between said slats communicate with an enlarged space beneath said openings to facilitate the collection of glass fragments in said enlarged space whenever said glass sheet fractures at or beyond said shaping station, said enlarged space providing access to remove glass fragments therefrom.

17. Apparatus as in claim 14, wherein said lower pressing mold comprises a plurality of spaced channel shaped members supported on said outline frame, each of said slats being slideably supported on a corresponding one of said channel members, locking means comprising means engageable by one end of each of said slats at one end of its corresponding channel member and means pivotally supported on said outline frame adjacent the other end of said channel members between a lowered position to provide clearance for moving said corresponding slat along its corresponding channel member and a raised position adapted to engage the other end of said corresponding slat, and means to lock or unlock said pivotally supported means to said other end of said corresponding slat in said raised position to provide means for rapidly changing the contour of the shaping surface of said lower pressing mold defined by the upper curved edges of said slats.

18. Apparatus as in claim 14, wherein said end area of said vacuum holder extends transversely beyond the corresponding transverse end of said spaced slats, and said shaping rail is mounted for movement clear of said corresponding transverse end of said spaced slats between said recessed position and said raised position.

19. Apparatus as in claim 18, wherein each of said spaced slats has a shaped upper edge including a main portion that conform to the main area of the shaping surface of said vacuum holder and a transverse end area of shallower curvature than a corresponding portion of said vacuum holder shaping surface.

20. Apparatus as in claim 14 wherein said shaping rail is a first shaping rail, said end portion of said glass sheet to be shaped is a first end portion and said apertured end area of said shaping surface is a first apertured end area, further including a second shaping rail associated with said vacuum holder having a glass sheet engaging surface and means to move said second shaping rail away from a second apertured end area of said apertured shaping surface spaced from said first end area, into a clear position to allow said glass sheet to be shaped to move into alignment with said vacuum holder and to move said second shaping rail toward said second apertured end area into an engaging position to move a second end portion of said glass sheet against said second apertured end area of said shaping surface.

21. Apparatus as in claim 11 wherein said shaping rail is a first shaping rail, said end portion of said glass sheet to be shaped is a first end portion and said apertured end area of said shaping surface is a first apertured end area, further including a second shaping rail associated with said vacuum holder having a glass sheet engaging surface and means to move said second shaping rail away from a second apertured end area of said apertured shaping surface spaced from said first end area, into a clear position to allow said glass sheet to be shaped to move into alignment with said vacuum holder and to move said second shaping rail toward said second apertured end area into an engaging position to move a second end portion of said glass sheet against said second apertured end area of said shaping surface.

22. Apparatus for bending a glass sheet comprising a furnace and a shaping station adjacent to and outside said furnace, said shaping station comprising:
  a vacuum holder with an apertured shaping surface;
  a lower pressing mold having spaced slats with curved upper edges separated by openings;
  means to move said lower pressing mold between a recessed position vertically spaced a relatively large vertical distance from said vacuum holder and a raised position in close enough proximity to said vacuum holder to enable the latter to engage a main portion of said glass sheet by vacuum when vacuum is applied to said vacuum holder;
  means to engage an end portion of said glass sheet to move and maintain said end portion against an end area of said vacuum holder when said main portion of said glass sheet is in vacuum engagement with said vacuum holder;
  an outline frame supporting said lower pressing mold; and
  an enlarged space beneath said outline frame constructed and arranged in communication with said openings to facilitate the collection of glass fragments in said enlarged space whenever said glass sheet fractures at or beyond said shaping station, said enlarged space providing access to remove glass fragments therefrom.

23. Apparatus as in claim 22, wherein said lower pressing mold comprises a plurality of spaced channel shaped members supported on said outline frame, each of said slats being slideably supported on a corresponding one of said channel members, locking means comprising means engageable by one end of each of said slats at one end of its corresponding channel member and means pivotally supported on said outline frame adjacent the other end of sid channel members between a lowered position to provide clearance for moving said corresponding slat along its corresponding channel member and a raised position adapted to engage the other end of said corresponding slat, and means to lock or unlock said pivotally supported means to said other end of said corresponding slat in said raised position to provide means for rapidly changing the contour of the shaping surface of said lower pressing mold defined by the upper curved edges of said slats.

* * * * *

UNITED STATES PATENT AND TRADEMARK OFFICE
CERTIFICATE OF CORRECTION

PATENT NO. : 4,501,603

DATED : February 26, 1985

INVENTOR(S) : Robert G. Frank, Michael T. Fecik, John J. Ewing

It is certified that error appears in the above-identified patent and that said Letters Patent is hereby corrected as shown below:

Column 13, line 33, delete "and".

Column 16, line 59, "sid" should be --said--.

Signed and Sealed this

Eighteenth Day of June 1985

[SEAL]

Attest:

DONALD J. QUIGG

Attesting Officer     Acting Commissioner of Patents and Trademarks